J. D. SHIPTON.
ZINC REDUCTION FURNACE.
APPLICATION FILED JUNE 10, 1919.

1,353,362.

Patented Sept. 21, 1920.
2 SHEETS—SHEET 1.

Inventor
James D. Shipton.
By Fred G. Dieterich
Attorneys

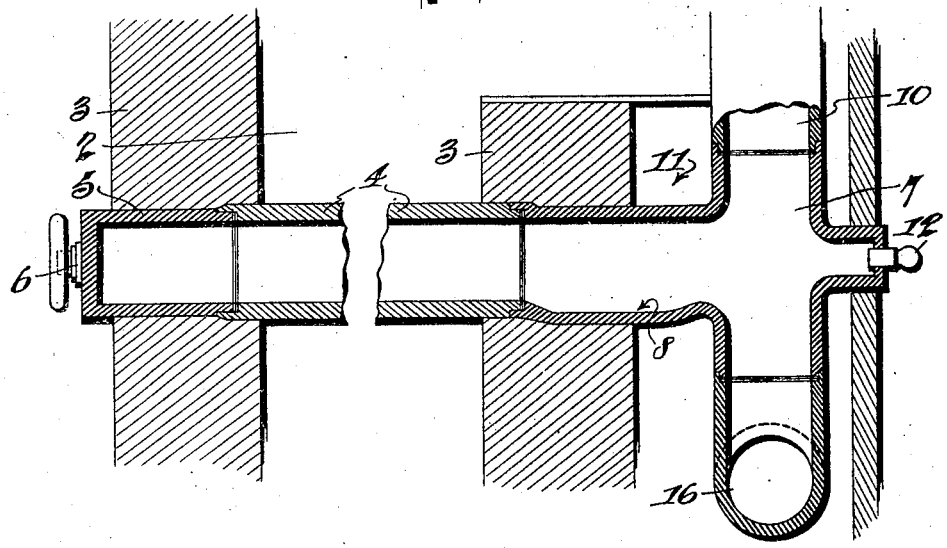
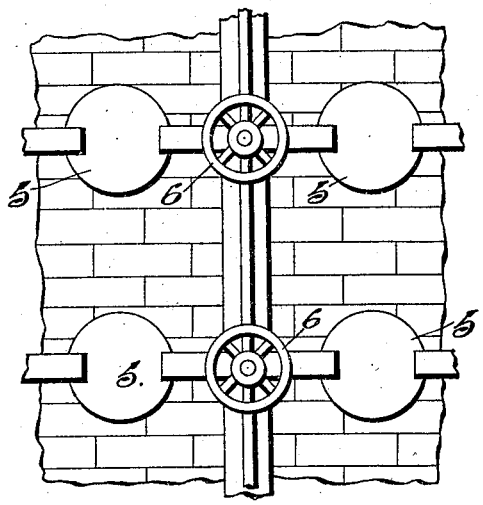

UNITED STATES PATENT OFFICE.

JAMES D. SHIPTON, OF VANCOUVER, BRITISH COLUMBIA, CANADA.

ZINC-REDUCTION FURNACE.

1,353,362.  Specification of Letters Patent.  Patented Sept. 21, 1920.

Application filed June 10, 1919. Serial No. 303,056.

*To all whom it may concern:*

Be it known that I, JAMES D. SHIPTON, a citizen of the Dominion of Canada, residing at Vancouver, in the Province of British Columbia, Canada, have invented certain new and useful Improvements in Zinc-Reduction Furnaces, of which the following is a specification.

This invention relates to a furnace for the reduction of metallic zinc from its ore, and is an improvement on that class known as the Belgian furnace, wherein the ore mixed with carbonaceous material is charged into cylindrical retorts which are exposed to the heat of a furnace and the vaporized zinc is condensed in a condenser connected to the end of the retort and projecting outside the furnace wall.

In the ordinary Belgian type of furnace each retort has its own condenser free from connection to any other and the condenser requires to be removed from such connection to allow the retort to be recharged and the condensed metal to be removed from the condenser.

This operation not only renders necessary damping down of the furnace, but involves a considerable loss of time and labor in removal and reconnection of the condensers and results in expensive losses through breakage of the condensers.

In the furnace, which is the subject of this application, the retort tubes are not built into the walls of the furnace by which they are supported, so that they are removable for replacement and are accessible for recharging through the aperture through which they are introduced, which apertures are closable with a thimble or cap.

To the opposite end of each retort tube a condenser is connected which is relatively permanently built into the wall of the furnace and does not require to be removed. The several condensers are also connected together in vertical tiers and the tops and bottoms of these condensers are connected together, provision being made whereby any one of the vertical tiers may be disconnected from the remainder for purposes of locating and replacing a broken or imperfect retort. This provides a larger condensing surface, and the retorts are inclosed within a condensing chamber within which a suitable condensing temperature may be maintained.

The invention is fully described in the following specification, reference being made to the drawings by which it is accompanied, in which:

Fig. 3 is a vertical section of the retort and its condenser to an enlarged scale showing connection of the same to the bottom collecting pipe, and Fig. 4 is a front elevation to the same scale showing the clamps by which the retort closing caps are secured.

Figure 2:
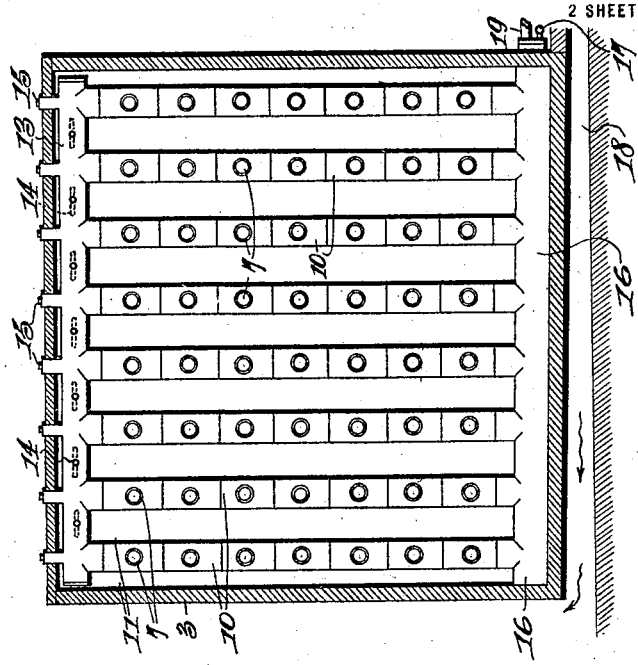
Fig. 2 is a sectional elevation through the condensing chamber, being on the line 2—2 in Fig. 1 showing the connection of the condensers to one another and the connection of the tiers at the top and bottom.
Figure 1:
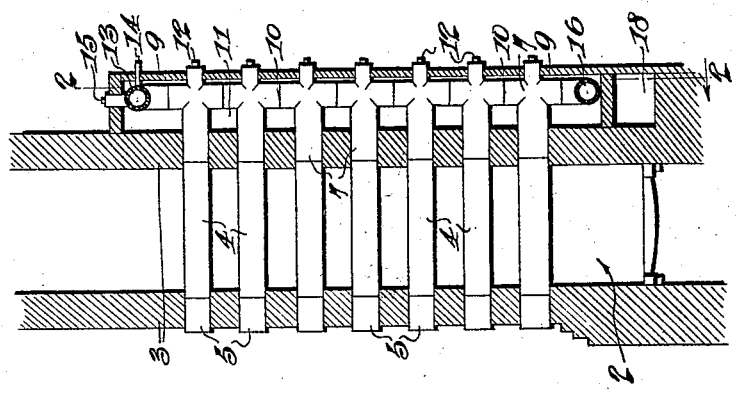
Figure 1 is a vertical cross section through the retort furnace and condensing chamber.

In these drawings 2 represents the furnace chamber, 3 being the side walls of the furnace between which walls cylindrical retort tubes 4 extend and project a sufficient distance into each wall to be supported thereby.

Where the retorts are provided with condensers at one end only, the apertures through which they are charged are closable with a cap 5 held in place by a clamp 6 which is tightened by a hand wheel threaded on studs secured in and projecting from a series of strong backs supporting the walls of the furnace.

The condensers 7 are built into the other wall 3 of the furnace in axial alinement with each retort tube 4, the end of the retort projecting a short distance into the condenser with rings of thin metal to form the joint. Each condenser 7 has a depression or pocket 8 in the underside, which is designed to retain a small amount of metallic zinc in the presence of which condensation it is said is more readily effected. The outer end of this tube 7 is produced to be supported by and project beyond an outer wall 9 which with the wall 3 incloses the condensing chamber 11.

Intermediate of its ends the condenser has a vertically disposed cross connection 10. The delivery from the pocket 8 of the condensers into the vertical cross connection 10 is slightly below the level of that end of the condenser which connects to the retort 4, so that the condensed metal in the pocket 8 will overflow into the vertical duct 10.

The end of the condenser tube which projects beyond the wall 9 provides for escape of the thick black smoke given off during the earlier stages of the reduction process, and when the higher heat is attained and carbon monoxid is given off, this aperture is closable with a plug 12. The vertical cross connection 10 of the adjacent condensers above and below are connected together in vertical tiers being jointed with an inter-projecting shoulder joint in the inner circle of which rings of thin sheet metal, as previously described, are inserted.

In the interstices between these rings the vapor condenses and oxidizes, effectually sealing the joint.

The upper ends of the several tiers of condensers are connected together by an upper cross pipe 13, which is provided with a butterfly damper or valve 14 between each tier. Opposite the connection of each tier to this cross pipe 13 is an aperture 15 closable with a plug through which apertures the thick black smoke may be allowed to escape and the vertical connection 10 may be cleaned.

The lower condenser of each tier delivers into the bottom cross pipe 16 which slopes downward toward one end for delivery of the condensed metal, either through a tapping aperture 17 or a suitable ladling receptacle. To this collecting pipe 16 a pipe 19 is connected through which the carbon monoxid may be delivered. Beneath this bottom collecting pipe 16 a flue 18 is conducted from the furnace by which sufficient heat is maintained in that pipe to prevent freezing of the metal in it.

The vapor from each condenser is thus free to condense in the space 7 or in the vertical cross branches 10 by which they are connected together, and the condensed metal overflows from the depressions 8. It also trickles down the sides of 10 as it condenses and is collected in the bottom cross pipe 16 from which it may be withdrawn as required.

The advantages of the construction hereinbefore described are:

That the process of zinc reduction, instead of terminating with exhaustion of the charge in the retort, as is usual, is practically continuous, as by removal of the caps 5, the retorts 4 can be individually recharged without lowering the temperature of the furnace, the re-charging being accomplished either by a filler specially designed for the purpose, or by the introduction of the charge in a container cartridge freely fitting the retort.

The condensers 7 being connected in vertical tiers as described, the metal, as it condenses trickles down their vertical connections 10 and may be withdrawn at intervals without any check to the continuity of the process.

This connection of the condensers to one another has a further advantage in the larger condensing surfaces provided, and in the fact that retort fire may be retained at a temperature to rapidly vaporize the zinc in the retorts 4 while the temperature of the condensing chamber 11 may be maintained at a satisfactory temperature for condensation.

Further, the vapors are condensed in the presence of metallic zinc which is considered to give the best results.

The condensers being relatively permanently secured in the wall of the furnace are not exposed to the continual loss through breakage as when they require to be periodically removed, and the considerable labor and loss of time in making and remaking the joint connection of the condensers to the retorts is saved.

In the event of a retort requiring renewal, the particular tier in which it is can be cut off from the rest by the butterfly valve 13, thus enabling repair to be effected without damping of the furnace.

Having now particularly described my invention, I hereby declare that what I claim as new and desire to be protected in by Letters Patent, is:

1. A zinc reduction furnace, comprising the combination with a series of retort tubes extending across the furnace and a corresponding series of condensers, said tubes having closable provision at one end through which they may be charged, and at the other end connected to one of the condensers, said condensers being connected together to form a common condensing surface with provision for withdrawing the metal condensed.

2. A zinc reduction furnace, comprising the combination with a series of retort tubes extending across the furnace, said tubes having closable provision at one end through which they may be charged, and at the other end connected to a condenser, said condensers being connected together in vertical tiers to form a common condensing surface with provision for withdrawing the metal condensed.

3. A zinc reduction furnace, comprising the combination with a series of retort tubes extending across the furnace, said tubes having closable provision at one end through which they may be charged, and at the other end connected to a condenser, said condensers being connected together in vertical tiers and the upper and lower end of each tier connected together to form a common condensing surface and conduct the condensed metal to a common outlet.

4. A zinc reduction furnace, comprising the combination with a series of retort tubes extending across the furnace, said tubes having closable provision at one end through which they may be charged, and at the other end connected to a condenser, said condensers being connected together in vertical tiers to form a common condensing surface with provision for withdrawing the metal condensed, and a valve in the top connection between each vertical tier.

5. A zinc reduction furnace, comprising the combination with a series of retort tubes extending across the furnace, each tube having a closable provision at one end through which it may be charged and a condenser connected to the other end, the outer ends of which condensers project through the furnace wall in which they are built into a closed chamber which may be maintained at a satisfactory condensing temperature.

6. A zinc reduction furnace, comprising the combination with retort tubes extending across the furnace, one end of each tube being closable with a removable cap applied outside the furnace wall and the other end connected to a condenser which projects outside the other wall, each condenser intermediate of its end having vertically disposed branch connections by which the adjacent condenser above and below may be connected to form vertical tiers, the open outer end of each condenser delivering through a curtain wall and being closable with a cap, the upper end of each vertical tier being connected to an upper cross pipe with a butterfly valve between each tier and the lower end of each tier connected to a cross connecting pipe through which the condensed metal is withdrawn.

7. A zinc reduction furnace, comprising the combination with a series of retort tubes extending across the furnace, said tubes having closable provisions at one end through which they may discharge, a condenser for each tube to which the other end of the respective tube is connected, ducts connecting said condensers together to form a common condensing surface with provision for withdrawing the metal condensed, the volume of the condensers and their connecting pipes being substantially the same as the volume of the retort tubes, so that the vapor tension is maintained during condensation.

In testimony whereof I affix my signature.

JAMES D. SHIPTON.